United States Patent
Balasuriya

(10) Patent No.: US 6,411,815 B1
(45) Date of Patent: Jun. 25, 2002

(54) COMMUNICATION SYSTEM AND METHOD FOR ARBITRATING SERVICE REQUESTS

(75) Inventor: Senaka Balasuriya, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/407,669

(22) Filed: Sep. 28, 1999

(51) Int. Cl.[7] .................................................. H04Q 7/28
(52) U.S. Cl. ........................................ 455/512; 455/520
(58) Field of Search .................................. 455/509, 510, 455/512, 514, 518, 519, 520, 521

(56) References Cited

U.S. PATENT DOCUMENTS 5,485,634 A * 1/1996 Weiser et al. .............. 455/67.1
5,638,055 A * 6/1997 McDonald et al. .......... 455/512
5,983,114 A * 11/1999 Yao et al. .................... 455/509

* cited by examiner

Primary Examiner—Lee Nguyen
(74) Attorney, Agent, or Firm—Jeffrey K. Jacobs

(57) ABSTRACT

The present invention addresses the need for an apparatus and method for arbitrating service requests in a more efficient and scalable manner. The present invention provides a hierarchical system for arbitrating service requests in which secondary arbitrators (104 and 105) that have incomplete information and authority evaluate service requests before forwarding them up the hierarchy to a primary arbitrator (102) that has complete information and arbitration authority. If a secondary arbitrator has sufficient information to deny a service request without forwarding the request, it will. Thus, the hierarchy of secondary arbitrators acts to filter service requests from the primary arbitrators.

17 Claims, 4 Drawing Sheets

COMMUNICATION SYSTEM AND METHOD FOR ARBITRATING SERVICE REQUESTS

FIELD OF THE INVENTION

The present invention relates generally to communication systems and, in particular, to arbitrating service requests within communication systems.

BACKGROUND OF THE INVENTION

Dispatch communication systems, such as the "iDEN" communication system sold by "MOTOROLA", enable a group of users to converse simultaneously. That is, one member of a group may talk to all the other members of the group in a broadcast fashion. Typically, each user of the group has a communication unit with a push-to-talk (PTT) button. To talk to the rest of the group, a user depresses the PTT button on his or her communication unit and continues depressing the PTT button while speaking. When finished or to allow another user of the group to speak, the user releases the PTT button. Another user may then speak by depressing his or her PTT button.

Only one group member may speak to the group at a time, but multiple group members may depress their PTT buttons to speak next. When a PTT button is depressed, the communication unit sends a PTT request to the infrastructure. The infrastructure must then arbitrate among all the PTT requests received, granting one request and denying the rest.

Today, there are two general approaches to performing this arbitration, centralized and decentralized arbitration. With centralized arbitration, all arbitration decisions for the system are made by a single arbitrator. With decentralized arbitration, all arbitration decisions for a given group's dispatch session are performed by a single arbitrator; however, the system may contain multiple arbitrators which share the burden of arbitrating all the system's requests.

As such dispatch systems expand and provide dispatch service to more and more subscribers (communication units), the number of PTT requests that must be arbitrated also expands. In a system that employs centralized arbitration, the single arbitrator may not have the processing power to keep up with the requests from the expanding subscriber base. In contrast, decentralized arbitration allows more arbitrators to be added to address the scalability issue. However, in both approaches, all request messaging must be conveyed by the infrastructure equipment to the particular arbitrator that will make the grant or deny decisions. Infrastructure bandwidth and processing power are utilized for the purpose of passing the request messaging to the appropriate arbitrator. In the end, such design requirements contribute to the equipment cost of systems. Conversely, limiting such design requirements, and thereby increasing the efficiency of the arbitration process, would likely contribute to equipment cost reductions.

Therefore, a need exists for an apparatus and method for arbitrating service requests in a more efficient and scalable manner.

DESCRIPTION OF A PREFERRED EMBODIMENT

Figure 1:
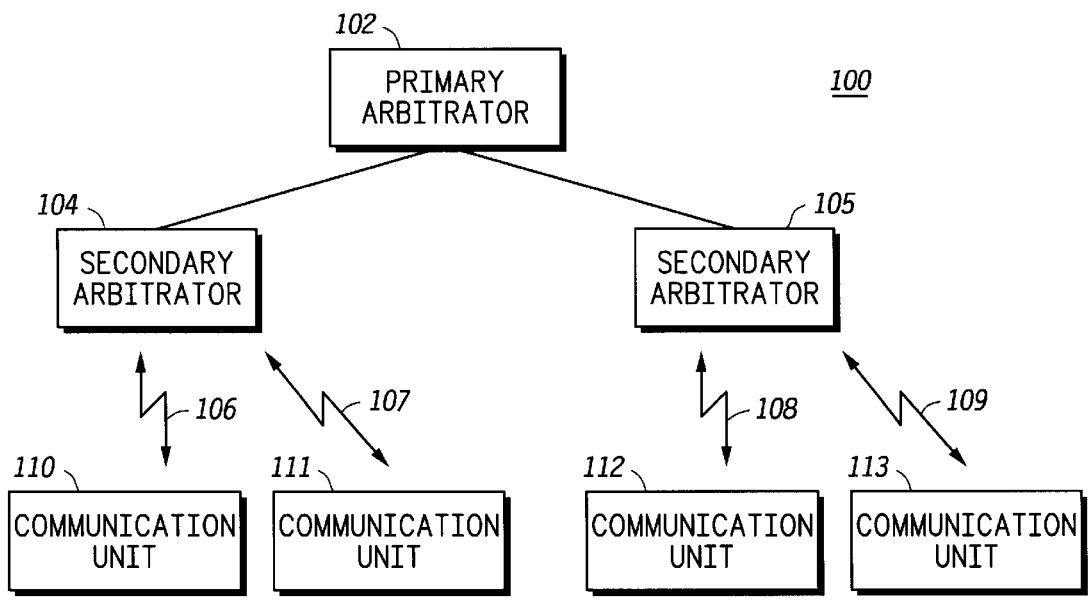
FIG. 1 is a block diagram depiction of a communication system in accordance with a preferred embodiment of the present invention.

The present invention addresses the need for an apparatus and method for arbitrating service requests in a more efficient and scalable manner. The present invention provides a hierarchical system for arbitrating service requests in which secondary arbitrators that have incomplete information and authority evaluate service requests before forwarding them up the hierarchy to a primary arbitrator that has complete information and arbitration authority. If a secondary arbitrator has sufficient information to deny a service request without forwarding the request, it will. Thus, the hierarchy of secondary arbitrators acts to filter service requests from the primary arbitrators.

The present invention encompasses a method for a communication system to arbitrate service requests from multiple communication units. The communication system comprises a hierarchy of service arbitrators with one or more primary arbitrators, having full arbitration authority, hierarchically above one or more secondary arbitrators that have less than full arbitration authority. A secondary arbitrator receives a service request that originated from a communication unit and determines whether the service request should be denied based on information available to the secondary arbitrator. When the secondary arbitrator determines that the service request should be denied, the secondary arbitrator notifies the communication unit that the service request is denied. Otherwise, when the secondary arbitrator determines that the service request should not be denied, the secondary arbitrator forwards the service request to a primary arbitrator.

Additionally, the present invention encompasses another method for a communication system to arbitrate service requests from multiple communication units. The communication system comprises a hierarchy of service arbitrators with a first secondary arbitrator hierarchically above a second secondary arbitrator where the first secondary arbitrator has greater arbitration authority than the second secondary arbitrator. The second secondary arbitrator receives a service request that originated from a communication unit and determines whether the service request should be denied based on information available to the second secondary arbitrator. When the second secondary arbitrator determines that the service request should be denied, the second secondary arbitrator notifies the communication unit that the service request is denied. Otherwise, when the second secondary arbitrator determines that the service request should not be denied, the second secondary arbitrator forwards the service request to the first secondary arbitrator.

The present invention also encompasses a communication system apparatus. The communication system apparatus comprises a secondary arbitrator capable of receiving a service request that originated from a communication unit and determining whether the service request should be denied based on information available to the secondary arbitrator. The secondary arbitrator is further capable of notifying the communication unit that the service request is denied, when the secondary arbitrator determines that the service request should be denied, and forwarding the service request when the secondary arbitrator determines that the service request should not be denied. The communication system apparatus also comprises a primary arbitrator, hierarchically coupled to the secondary arbitrator and hierarchically above the secondary arbitrator, capable of receiving the forwarded service request and determining whether the service request can be granted.

The present invention can be more fully understood with reference to FIGS. 1–5. FIG. 1 is a block diagram depiction of a communication system 100 in accordance with a preferred embodiment of the present invention. Communication system 100 comprises a plurality of communication units 110–113, a plurality of secondary arbitrators 104–105, and a primary arbitrator 102. Preferably, communication system 100 comprises an "iDEN" communication system, all components of which are commercially available from "MOTOROLA", Inc. of Schaumburg, Ill. Accordingly, communication units 110–113 preferably comprise "iDEN" wireless phones. In the preferred embodiment, secondary arbitrators 104–105 are each implemented as software routines that are stored in and executed by a base site, specifically an "iDEN" Enhanced Base Transceiver System (EBTS) site. Similarly, primary arbitrator 102 is preferably implemented as software routines that are stored in and executed by a call controller, specifically an "iDEN" Dispatch Application Processor (DAP). Although only two secondary arbitrators, four communication units, and one primary arbitrator is shown, it should be clearly understood that a communication system in accordance with the present invention may comprise any number of primary arbitrators and any number of secondary arbitrators supporting any number of communication units. The communication system 100 of FIG. 1 is illustrated in limited form for the purpose of simplicity.

Secondary arbitrator 104 interfaces with communication units 110 and 111 via air interfaces 106 and 107, respectively. Likewise, secondary arbitrator 105 interfaces with communication units 112 and 113 via air interfaces 108 and 109, respectively. The air interfaces 106–109 are preferably standard "iDEN" air interfaces.

Operation of the preferred primary arbitrator 102 and secondary arbitrators 104 and 105, in accordance with the present invention, occurs substantially as follows. Preferably, communication system 100 is a dispatch capable communication system. For the purpose of illustration, communication units 110–113 are considered to be members of the same dispatch group. The communication units 110–113 are, therefore, logically arranged into a dispatch group and are each associated with a dispatch identifier, or talkgroup ID, common to the group.

The secondary arbitrator 104 receives a service request originating from communication unit 110, for example. This service request preferably comprises a PTT request. The secondary arbitrator 104 determines whether the service request should be denied based on information available to the secondary arbitrator 104. Preferably, the information available to secondary arbitrator 104 includes the resource availability of the local base site and information related to the talkgroup ID of the service request received. For example, the secondary arbitrator 104 can determine whether any communication channels at the local base site are available to be used for the service request. Also, the secondary arbitrator 104 can determine whether it has received any other service requests from other members of that dispatch group, what the priority of those requests were, and whether or not any of those requests have been granted. Assuming that no other service requests associated with the talkgroup ID of the service request have been received, the secondary arbitrator 104 determines that the service request should not be denied.

In accordance with the present invention, a secondary arbitrator has the authority to deny requests but not grant them. In contrast, a primary arbitrator, which is hierarchically above one or more secondary arbitrators, has full arbitration authority and can, therefore, grant or deny service requests. Thus, the secondary arbitrator 104 forwards the service request to the primary arbitrator 102.

Now if secondary arbitrator 104 receives a PTT service request from communication unit 111, for example, secondary arbitrator 104 will determine whether the service request should be denied based on information available to the secondary arbitrator 104. Preferably, this information includes that received by the secondary arbitrator 104 in the service request from communication unit 110. The preferred method of making this determination is discussed below with regard to FIG. 3. If the secondary arbitrator 104 determines that the service request from communication unit 111 should be denied, the secondary arbitrator 104 notifies the communication unit 111 that the service request is denied. Otherwise, the secondary arbitrator 104 forwards the service request to the primary arbitrator 102.

Instead, if secondary arbitrator 105 receives a service request from either communication unit 112 or communication unit 113, secondary arbitrator 105 will determine whether the service request should be denied based on information available to the secondary arbitrator 105. Secondary arbitrator 105 preferably will not have any information about service requests received by secondary arbitrator 104 available. If the secondary arbitrator 105 determines that the service request should be denied, the secondary arbitrator 105 notifies the requesting communication unit that the service request is denied. Otherwise, the secondary arbitrator 105 forwards the service request to the primary arbitrator 102.

The primary arbitrator 102 receives the forwarded (i.e., the undenied) service requests and, having full arbitration authority, determines whether any of the service requests can be granted. Preferably, all the necessary information to make this determination is available to the primary arbitrator 102. Thus, the secondary arbitrators 104 and 105 forward to primary arbitrator 102 service requests for which the secondary arbitrators 104 and 105 do not have sufficient information available to deny.

Figure 2:
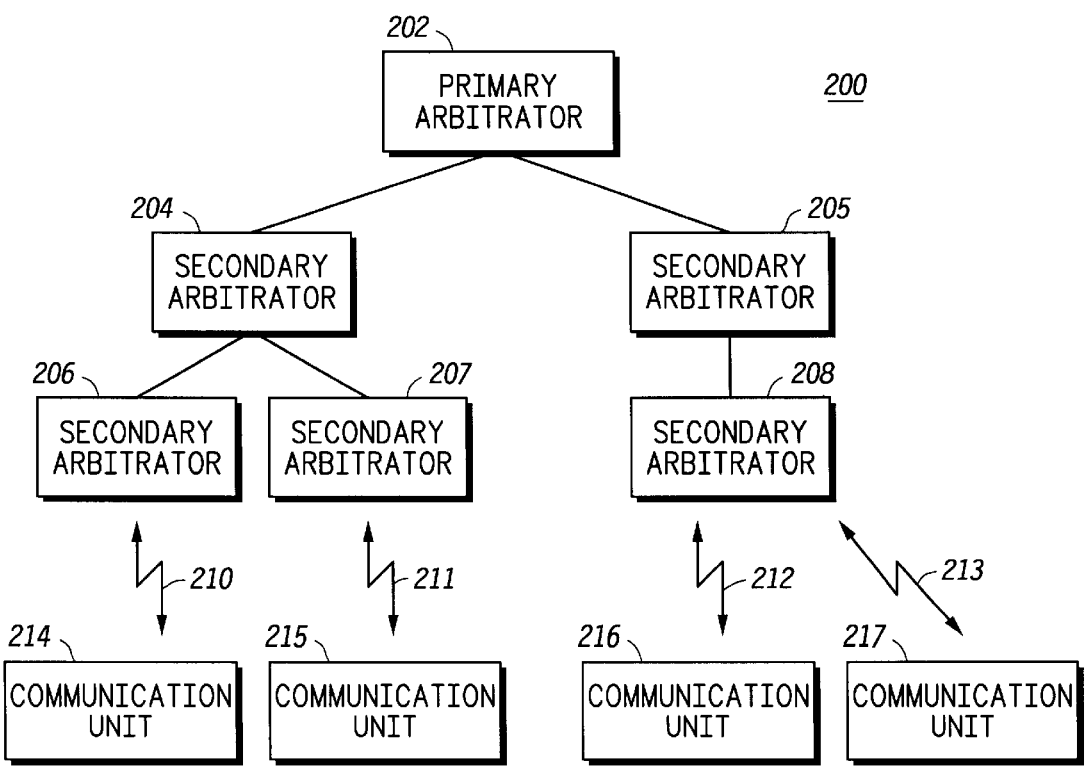
FIG. 2 is a block diagram depiction of a communication system in accordance with an alternate embodiment of the present invention.

FIG. 2 is a block diagram depiction of a communication system 200 in accordance with an alternate embodiment of the present invention. Alternate communication system 200 differs from preferred communication system 100 in the implementation of the present invention in an "IDEN" communication system. Similar to communication system 100, communication units 214–217 comprise "iDEN" wireless phones, air interfaces 210–213 are standard "iDEN" air interfaces, and secondary arbitrators 206–208 are each implemented as software routines that are stored in and executed by a base site, specifically an "iDEN" Enhanced Base Transceiver System (EBTS) site. In contrast to communication system 100, secondary arbitrators 204 and 205 are each implemented as software routines that are stored in and executed by a base site controller, specifically an "iDEN" Base Site Controller (BSC). In addition, primary arbitrator 202 is implemented as software routines that are stored in and executed by a switch, specifically an "iDEN" Mobile Switching Center (MSC).

The primary arbitrator 202 has full arbitration authority and therefore sits atop the arbitration hierarchy. Secondary arbitrators 204–208 are below the primary arbitrator 202 and have less than full arbitration authority. Secondary arbitrators 206 and 207 are hierarchically below secondary arbitrator 204, and secondary arbitrator 208 is hierarchically below secondary arbitrator 205. As one moves down the hierarchy, from primary arbitrator 202, to secondary arbitrator 204, to secondary arbitrator 206 arbitration authority diminishes. Diminishing authority is primarily the result of the diminishing amount of information available to each arbitrator in the hierarchy as one moves down.

Operation of the alternate communication system 200, in accordance with the present invention, occurs substantially as follows. This alternate embodiment of the present invention addresses interconnect call request arbitration. An interconnect call, like a telephone call, is between two parties. For example, communication unit 216 sends a call request to secondary arbitrator 208 requesting to establish a call with communication unit 214. Secondary arbitrator 208 forwards the call request to secondary arbitrator 205, which then forwards the call request to primary arbitrator 202. Primary arbitrator 202 grants the call request, notifies communication unit 214 via secondary arbitrators 204 and 206, and notifies communication unit 216 via secondary arbitrators 205 and 208. Thus, secondary arbitrators 204–206 and 208 have information regarding the granted call request between communication units 214 and 216.

If secondary arbitrator 208 receives a call request from communication unit 217 for either communication unit 214 or communication unit 216, secondary arbitrator 208 will determine whether the service request should be denied based on available information. Since secondary arbitrator 208 knows of the call between communication units 214 and 216, secondary arbitrator 208 will determine that the service request should be denied and notify the communication unit 217 that the call request is denied.

If, instead or in addition, secondary arbitrator 207 receives a call request from communication unit 215 for either communication unit 214 or communication unit 216, secondary arbitrator 207 will determine whether the service request should be denied based on available information. However, since secondary arbitrator 207 does not know of the call between communication units 214 and 216, secondary arbitrator 207 will determine that the service request should not be denied and forward the service request to secondary arbitrator 204. Secondary arbitrator 204, aware of the call between communication units 214 and 216, will then determine that the service request should be denied. Lastly, secondary arbitrator 204 will notify the communication unit 215, via secondary arbitrator 207, that the call request is denied.

The efficiency of the present invention's hierarchical arbitration is illustrated in the above example. Both communication unit 217 and communication unit 215 made call requests that required arbitration. The lowest secondary arbitrator in the hierarchy that had enough information available to deny each request did. Thus, the service requests were not forwarded unnecessarily, and the primary arbitrator did not have to process either request.

Figure 3:
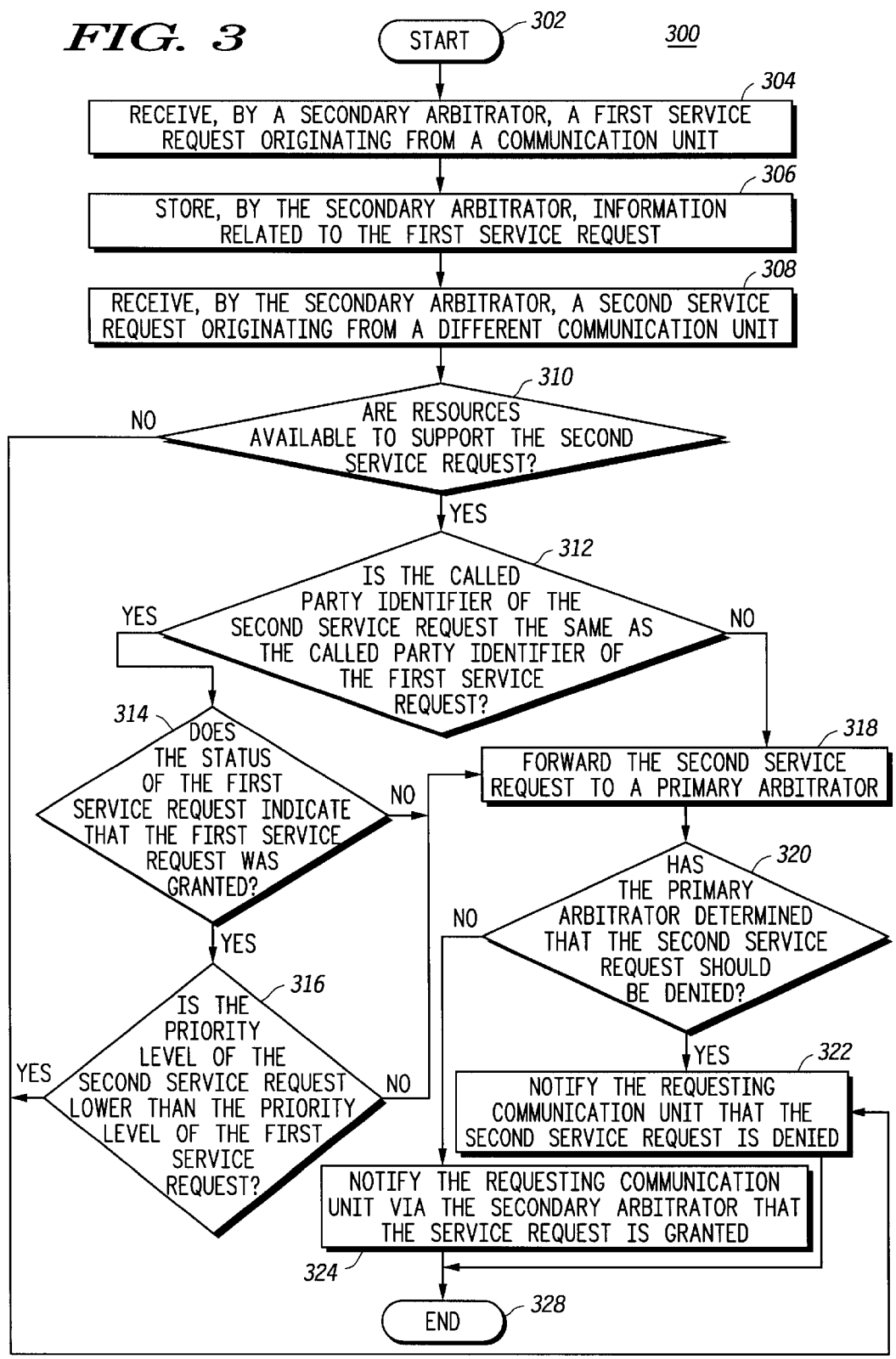
FIG. 3 is a logic flow diagram of steps executed by a communication system to arbitrate service requests from communication units in accordance with a preferred embodiment of the present invention.

FIG. 3 is a logic flow diagram 300 of steps executed by a communication system to arbitrate service requests from communication units in accordance with a preferred embodiment of the present invention. The communication system preferably comprises a primary arbitrator, with full arbitration authority, hierarchically above one or more secondary arbitrators, each with less arbitration authority than the primary arbitrator.

The logic flow begins (302) when a secondary arbitrator receives (304) a service request that originated from a communication unit. The secondary arbitrator then preferably stores (306) information related to the service request. Depending on the type of service request, such information would preferably include any or all of the following: a called party identifier, a calling party identifier, a priority level of the service request, a requested quality of service, and a status of the service request. For example, if a PTT request is received, a dispatch identifier (called party identifier), communication unit ID (calling party identifier), a priority level of the PTT request, and a status of the PTT request (e.g., a request pending status) would preferably be stored. Other types of service requests may indicate a quality of service such as a requested voice quality level, for example. Quality of service information is preferable stored because it affects the communication resource requirements of the service request.

The secondary arbitrator further receives (308) a later service request that originated from a different communication unit. The secondary arbitrator then determines whether the later service request should be denied based on information available to the secondary arbitrator. To make this determination, the secondary arbitrator first determines (310) whether resources to support a requested quality of service of the later service request are available. When such resources are not available, the secondary arbitrator determines that the service request should be denied and notifies (322) the requesting communication unit that the service request is denied. Otherwise, the secondary arbitrator continues the process of determining whether the later service request should be denied. It should be understood, that some service requests, especially dispatch requests, are not denied for lack of resources but rather queued until resources become available. Thus, lack of resources would not be a consideration in determining whether to deny such a service request.

The secondary arbitrator next determines (312) whether a called party identifier of the later service request is the same as the called party identifier of the service request. If the called party identifiers are not the same, then preferably there is no reason to deny the later request. Thus, the later service request is forwarded (318) to the primary arbitrator. However, when the called party identifiers are the same, the secondary arbitrator next considers (314) whether the status of the service request indicates that the service request was granted. In an alternate embodiment, the secondary arbitrator may determine to deny the later service request when the called party identifiers are the same. Service requests would thus be granted in a strictly first-come-first-served fashion.

In the preferred embodiment, however, when the status of the service request indicates that the service request was not granted, then the secondary arbitrator determines that the later service request should be forwarded (318) to the primary arbitrator. Otherwise, when the status of the service request indicates that the service request was granted, the secondary arbitrator compares (316) the priority level of the later service request to the priority level of the service request. The secondary arbitrator determines that the service request should be denied, when the priority level of the later service request is lower than the priority level of the service request, and notifies (322) the requesting communication unit. Otherwise, when the priority level of the later service request is higher, the later service request is forwarded (318) to the primary arbitrator.

Preferably, the primary arbitrator then makes the final determination (320) whether the later service request should be denied or granted. The primary arbitrator makes this determination using dispatch call processing techniques known in the art. When the primary arbitrator determines that the service request should be denied, the primary arbitrator notifies (322) the communication unit via the secondary arbitrator that the service request is denied. When, instead, the primary arbitrator determines that the service request should not be denied and can be granted, the primary arbitrator notifies (324) the communication unit via the secondary arbitrator that the service request is granted. Finally, the logic flow ends upon executing either step 322 or step 324.

Figure 4:
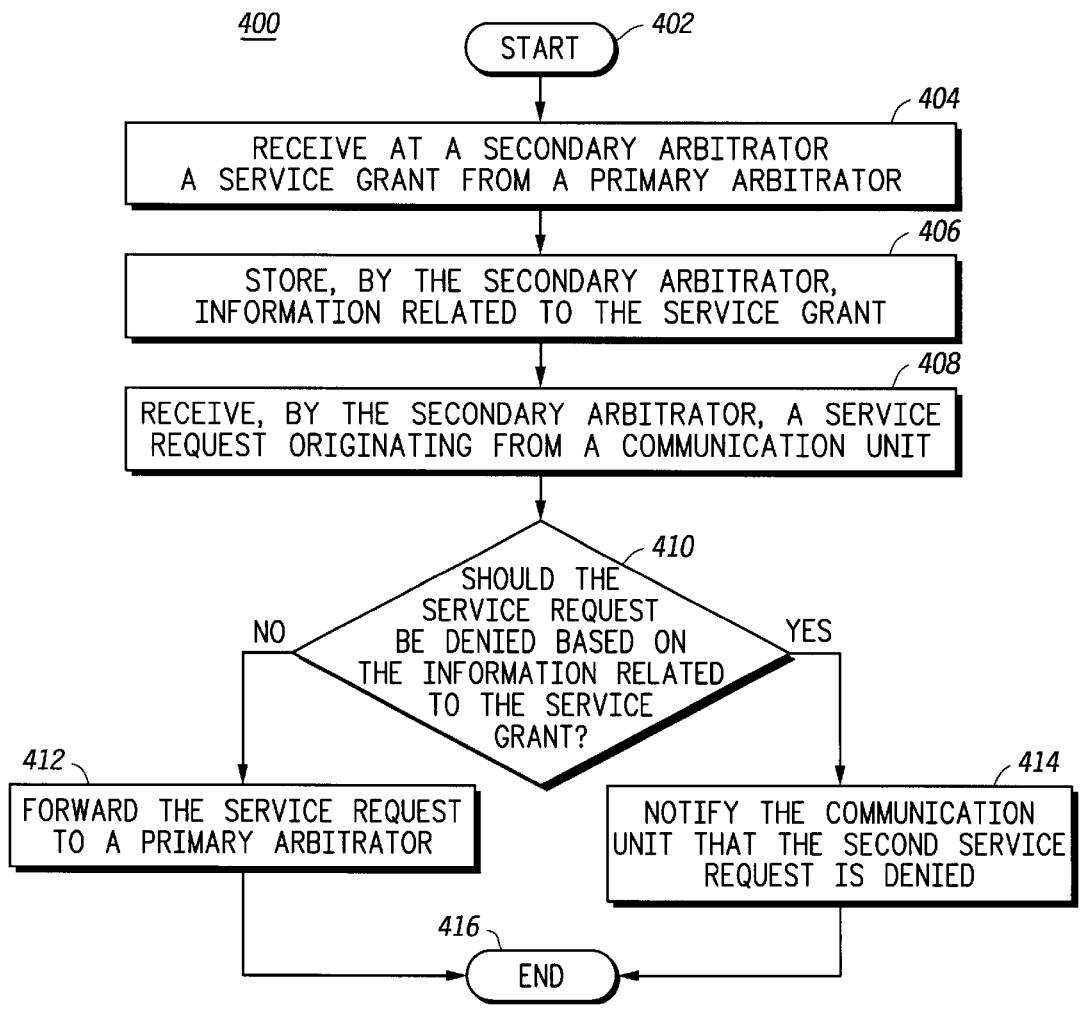
FIG. 4 is a logic flow diagram of steps executed by a secondary arbitrator to arbitrate service requests in accordance with a preferred embodiment of the present invention.

FIG. 4 is a logic flow diagram 400 of steps executed by a secondary arbitrator to arbitrate service requests in accordance with a preferred embodiment of the present invention. The logic flow begins (402) when the secondary arbitrator receives (404) a communication service grant from a primary arbitrator. The secondary arbitrator preferably stores (406) information related to the communication service grant. The secondary arbitrator further receives (408) a service request that originated from a communication unit. The secondary arbitrator evaluates (410) the service request using the stored information, preferably in the same manner described above with respect to FIG. 3. When the secondary arbitrator determines that the service request should be denied, based on the information related to the communication service grant, the secondary arbitrator notifies (414) the communication unit that the service request is denied. Instead, when the secondary arbitrator determines that the service request should not be denied, the secondary arbitrator forwards (412) the service request to the primary arbitrator. In either case, the logic flow ends (416).

Figure 5:
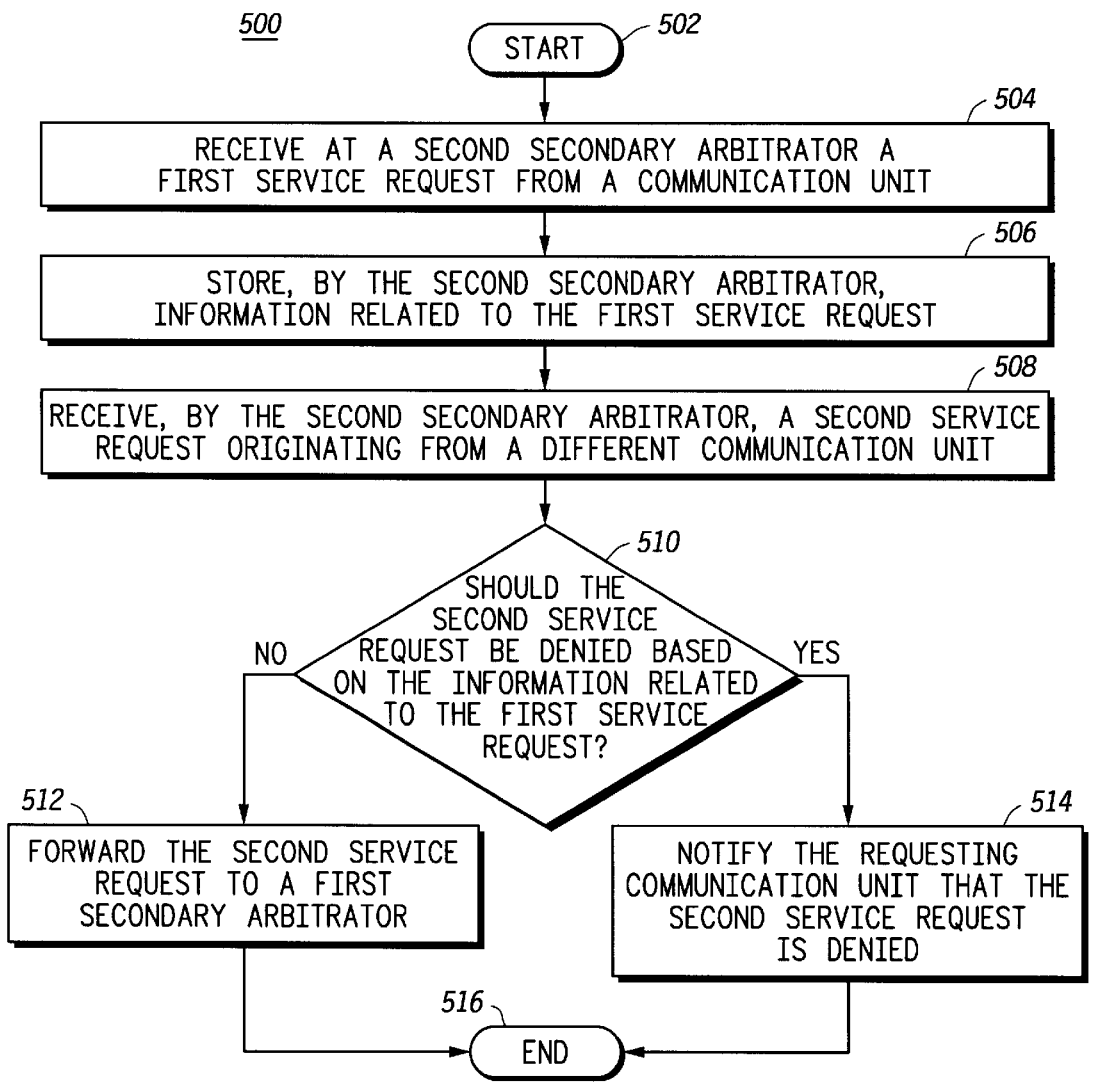
FIG. 5 is a logic flow diagram of steps executed by a secondary arbitrator to arbitrate service requests in accordance with an alternate embodiment of the present invention.

FIG. 5 is a logic flow diagram 500 of steps executed by a secondary arbitrator in a communication system to arbitrate service requests in accordance with an alternate embodiment of the present invention. The communication system comprises a primary arbitrator, with full arbitration authority, hierarchically above one or more secondary arbitrators, each with less arbitration authority than the primary arbitrator, that in turn are hierarchically above one or more other secondary arbitrators. The steps of logic flow diagram 500 are executed by a second secondary arbitrator that is hierarchically below a first secondary arbitrator.

The logic flow begins (502) when the second secondary arbitrator receives (504) a service request that originated from a communication unit. The second secondary arbitrator stores (506) information related to the service request. The second secondary arbitrator further receives (508) a later service request that originated from a different communication unit. The second secondary arbitrator determines (510) whether the later service request should be denied based on information available to the second secondary arbitrator, including the information related to the service request. When the second secondary arbitrator determines that the later service request should be denied, the second secondary arbitrator notifies (514) the requesting communication unit that the later service request is denied. Otherwise, when the second secondary arbitrator determines that the service request should not be denied, the second secondary arbitrator forwards (512) the service request to the first secondary arbitrator. In either case, the logic flow ends (516).

Thus, the present invention provides a hierarchical system for arbitrating service requests. Each secondary arbitrator in the hierarchy evaluates received service requests against criteria that would cause the service request to be denied based on the information available to that secondary arbitrator. When no available information favors a denial decision, the service request is forwarded up the hierarchy to either another secondary arbitrator or to a primary arbitrator. Once a service request reaches an arbitrator that has information favoring a denial, however, the service request is not forwarded further.

In contrast to the prior art, all service requests do not have to be passed on to a primary arbitrator. This increases arbitration efficiency and scalability. The filtering effect of the hierarchy reduces the number of service requests that must be passed through the infrastructure and that must be processed by a primary arbitrator. Moreover, as a communication system expands, secondary arbitrators are simply added to the hierarchy incrementally. In prior art systems, primary arbitrators must either be upgraded, replaced, or added to meet the growing needs of expanding systems. Adding a secondary arbitrator to a hierarchy is likely to be far less intrusive and disruptive than changes involving a primary arbitrator. Hence, the present invention is likely to increase the efficiency and scalability of prior art systems.

The descriptions of the invention, the specific details, and the drawings mentioned above, are not meant to limit the scope of the present invention. For example, the hierarchical arbitration system of the present invention can be used in any communication system that must arbitrate among competing or conflicting service requests. The present invention is particularly applicable to the emerging area of ad-hoc networking. An ad-hoc network may form spontaneously from the proximity of potential network nodes, such as a cluster of ships, aircraft, and/or tanks or a cluster of communication units that link up form to a communication network. It is the intent of the inventors that various modifications can be made to the present invention without varying from the spirit and scope of the invention, and it is intended that all such modifications come within the scope of the following claims and their equivalents.

What is claimed is:

1. A method for a communication system to arbitrate service requests from a plurality of communication units, the communication system comprising a hierarchy of service arbitrators with at least one primary arbitrator hierarchically above at least one secondary arbitrator, the at least one primary arbitrator having full arbitration authority and the at least one secondary arbitrator having less arbitration authority than the at least one primary arbitrator, the method comprising the steps of:

receiving, by a secondary arbitrator of the at least one secondary arbitrator, a service request that originated from a communication unit of the plurality of communication units;

determining, by the secondary arbitrator, whether the service request should be denied based on information available to the secondary arbitrator;

when the secondary arbitrator determines that the service request should be denied, notifying the communication unit that the service request is denied;

when the secondary arbitrator determines that the service request should not be denied, forwarding the service request to a primary arbitrator of the at least one primary arbitrator;

receiving, prior to the step of receiving a service request, an earlier service request that originated from a second communication unit of the plurality of communication units; and storing information related to the earlier service request, wherein information related to the earlier service request comprises information selected from the group consisting of a priority level of the earlier service request and a requested quality of service.

2. The method of claim 1 wherein the service request comprises a call request.

3. The method of claim 1 wherein the plurality of communication units is logically arranged into a dispatch group associated with a dispatch identifier and wherein the service request comprises a push-to-talk (PTT) request.

4. The method of claim 1 wherein each communication unit of the plurality of communication units is associated with a dispatch identifier and wherein the service request comprises a push-to-talk (PTT) request.

5. The method of claim 1 wherein the step of determining comprises the step of determining that the service request should be denied when the status of the earlier service request indicates that the earlier service request was granted.

6. The method of claim 1 wherein the step of determining comprises the steps of:
comparing a priority level of the service request to a priority level of the earlier service request; and
when the priority level of the service request is lower than the priority level of the earlier service request, determining that the service request should be denied.

7. The method of claim 1 wherein the step of determining comprises the steps of;
determining whether a called party identifier of the service request is the same as a called party identifier of the earlier service request; and
when the called party identifier of the service request is the same as the called party identifier of the earlier service request, determining that the service request should be denied.

8. The method of claim 1 wherein the step of determining comprises the steps of:
determining whether resources to support a requested quality of service of the service request are available; and
when resources to support a requested quality of service of the service request are not available, determining that the service request should be denied.

9. The method of claim 1 further comprising the steps of:
determining, by the primary arbitrator, whether the service request should be denied;
when the primary arbitrator determines that the service request should be denied, notifying the communication unit via the secondary arbitrator that the service request is denied; and
when the primary arbitrator determines that the service request should not be denied and can be granted, notifying the communication unit via the secondary arbitrator that the service request is granted.

10. The method of claim 1, further comprising the steps of:
receiving, by the secondary arbitrator prior to the step of receiving a service request, a communication service grant from the primary arbitrator; and
storing, by the secondary arbitrator, information related to the communication service grant.

11. The method of claim 10 wherein the step of determining comprises the step of determining that the service request should be denied based on the information related to the communication service grant.

12. A method for a communication system to arbitrate service requests from a plurality of communication units, the communication system comprising a hierarchy of service arbitrators with a first secondary arbitrator hierarchically above a second secondary arbitrator, the first secondary arbitrator having greater arbitration authority than the second secondary arbitrator, and with a primary arbitrator hierarchically above the first secondary arbitrator and having full arbitration authority, the method comprising the steps of:

receiving, by the second secondary arbitrator, a service request that originated from a communication unit of the plurality of communication units:

determining, by the second secondary arbitrator, whether the service request should be denied based on information available to the second secondary arbitrator;

when the second secondary arbitrator determines that the service request should be denied, notifying the communication unit that the service request is denied;

when the second secondary arbitrator determines that the service request should not be denied, forwarding the service request to the first secondary arbitrator;

determining, by the first secondary arbitrator, whether the service request should be denied based on information available to the first secondary arbitrator;

when the first secondary arbitrator determines that the service request should be denied, notifying the communication unit that the service request is denied; and when the first secondary arbitrator determines that the service request should not be denied, forwarding the service request to the primary arbitrator.

13. The method of claim 12, further comprising the steps of:

receiving, prior to the step of receiving a service request, an earlier service request that originated from a second communication unit of the plurality of communication units; and storing information related to the earlier service request.

14. The method of claim 13 wherein the step of determining comprises the step of determining that the service request should be denied based on the information related to the earlier service request.

15. A communication system comprising:

a secondary arbitrator capable of receiving a service request that originated from a communication unit, determining whether the service request should be denied based on information available to the secondary arbitrator, when the secondary arbitrator determines that the service request should be denied, notifying the communication unit that the service request is denied, and when the secondary arbitrator determines that the service request should not be denied, forwarding the service request;

a second secondary arbitrator, hierarchically coupled to the secondary arbitrator and hierarchically below the secondary arbitrator, capable of receiving the service request that originated from the communication unit, determining whether the service request should be denied based on information available to the second secondary arbitrator, when the second secondary arbitrator determines that the service request should be denied, notifying the communication unit that the service request is denied, and when the secondary arbitrator determines that the service request should not be denied, forwarding the service request to the secondary arbitrator; and a primary arbitrator, hierarchically coupled to the secondary arbitrator and hierarchically above the secondary arbitrator, capable of receiving the forwarded service request and determining whether the service request can be granted.

16. The communication system of claim 15 wherein the primary arbitrator comprises a call controller and wherein the secondary arbitrator comprises a base site.

17. The communication system of claim 15 wherein the primary arbitrator comprises a switch, wherein the secondary arbitrator comprises base site controller, and wherein the second secondary arbitrator comprises a base site.

* * * * *